United States Patent Office 2,866,736
Patented Dec. 30, 1958

2,866,736
SELECTIVE REDUCTION OF KETOSTEROIDS WITH YEAST

Bruno Camerino and Alberto Vercellone, Milan, Italy, assignors to Società Farmaceutici Italia, a corporation of Italy No Drawing. Application August 12, 1954
Serial No. 449,506

1 Claim. (Cl. 195—51)

It is an object of the present invention to provide a new application of the biochemical method of reduction and more in particular a process for reducing carbonylic groups of steroids by action of fermenting yeast, for the production of intermediates of importance for the synthesis of cortical steroid hormones, in particular for the production of 3-alcohol steroids. The reduction of carbonylic groups of steroids by action of fermenting yeast has already been experimented successfully in the male sex hormones and estrogenic hormones field. On the contrary, in the pregnane and allopregnane derivatives group, to which belong, for instance, progesterone, desoxycorticosterone and cortisone, up to date no reduction by means of yeast has been obtained.

Thus, pregnan-3,20-dione and allopregnan-3,20-dione as is well known, are not attacked.

It has now been found that, on the contrary, pregnan and allopregnan-3,11,20-trion as well as allopregnan-11α-ol-3,20-dion are reduced selectively in C–3 by yeast.

In other words, it has been found that the introduction of an oxygenated function into the pregnan-dione or allopregnan-dione molecule in position 11 confers surprisingly a higher reactivity to the carbonyl in C–3.

Subjecting for instance, pregnan-3,11,20-trione for about 130 hours to the action of fermenting yeast, we have isolated a compound containing an alcoholic function (formation of monoacetate); the M. P. and rotatory power of this compound corresponded to those of pregnan-3α-ol-11,20-dione.

The identity was confirmed by comparison with an authentic sample. Pregnan-3α-ol-11,20-dione is an important intermediate in the cortisone synthesis.

It is interesting to note that with the biochemical reduction method only one of the two stereoisomeric alcohols which are to be expected with the introduction of a new center of asymmetry into the molecule, is formed. Instead, the reduction wtih chemical means yields mixtures.

Still according to the present invention, this reduction method is also applied to other pregnane and allopregnane derivatives having an oxygenated function in C–11; namely allopregnan-3,11,20-trion and allopregnan-11α-ol-3,20-dion, which are reduced selectively in position 3 by the fermenting yeast, to allopregnan-3α-ol-11,20-dion and to allopregnan-3β,11α-diol-20- or, respectively (whereas, for example, pregnan-3,20-dione-17α-ol, pregnan-3,20-dione-21-ol acetate and allopregnan-3,20-dione-21-ol acetate, which have an alcoholic function in position 17 or 21 of the steroid nucleus and not in position 11 as necessary for the reduction, are not reduced).

It has also been found however that the reducing enzymatic action of the yeast on the compounds in question can be inhibited by the presence of a double bond in position 4,5 (as in 11-α-hydroxy-progesterone and in 11-keto-progesterone) by the presence of a dihydroxyacetonic chain in position 17 (as in allopregnan-3,11,20-trione-17α,21-diol-21-acetate and in allopregnan-11β,17α-21-triol-3,20-dione - 21 - acetate—two alcoholic groups in positions 17 and 21); and by esterification of the 11-alcohol (as in pregnan-3,20-dione-11α-ol acetate and in allopregnan-3,20-dione-11α-ol acetate). The process according to the present invention—which comprises putting together a yeast suspension in sugared water and the substance to be reduced, preferably dissolved in an organic solvent mixable with water to obtain a better dispersion, fermentation and finally filtration nad extraction, according to methods known per se—has been applied successfully in the cases described in the examples.

EXAMPLE 1

Pregnan-3α-ol-11,20-dione (II) from pregnan-3,11,20-trione (I)

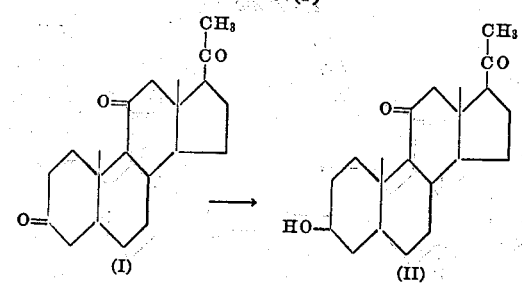

20 g. of pressed yeast were mashed with a sterile solution of 40 g. of common sugar in 300 cc. of tap water and the mixture was poured into a 2-litre flask fitted with a bubble-counter.

The mixture was left in a thermostat at 27° C. for one hour; a solution of 0.5 g. of pregnan-3,11,20-trione, M. P. 150–155° C., in 5 cc. of ethanol was added and the whole left to ferment at 27° C. for 48 hours.

After this period of time, 20 g. of yeast were added again, with the aid of a solution of 40 g. of sugar in 300 cc. of water, and the procedure was repeated a third time after 48 hours.

After a total of 120–140 hours the solution was filtered, the filtrate was extracted repeatediy with ether, the ether was washed with diluted acid and alkali solutions and with water, the residue was dried on sodium sulphate and the ether was distilled.

There remained 0.55 g. of oleous product. The residue was dissolved in benzene and a chromatography was made on 15 g. of aluminium oxide. The fractions eluted with benzene-ether (1:1) and ether yielded 300 mg. of pregnan-3α-ol-11,20-dione, M. P. 160–165° C. By recrystallization the M. P. increased up to 169–171° C.; when mixed with an authentic sample; the M. P. did not decrease. The product could also be isolated, without chromatography, by crystallization from ether.

The acetate, prepared in the usual manner, melted at 132–134° C. and did not give depression when mixed with an authentic sample of pregnan-3α-acetoxy-11,20-dione.

EXAMPLE 2

Allopregnan-3β,11α-diol-20-one (IV) from allopregnan-3,20-dione-11α-ol (III)

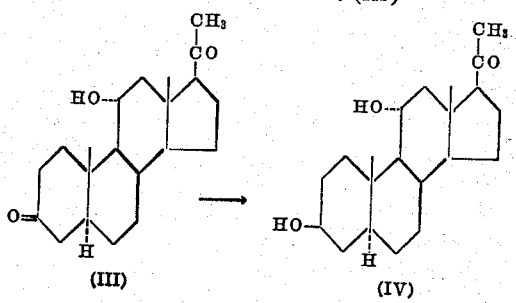

Proceeding as in Example 1, 0.5 g. of allopregnan-3,20-dione-11α-ol, M. P. 190–195° C., dissolved in 25 cc. of ethanol are added to the suspension of fermenting yeast. After 130 hours the yeast is filtered off and the filtrate is extracted with ether; the ether is washed with acid, alkali and water, then drying and distillation are carried out. 350 mg. of allopregnan-3β,11α-diol-20-one, M. P. 178–180° C., are obtained. By re-crystallization from acetone-ether, the M. P. rises up to 179–181° C. O. Mancera and co-workers (Journal of Organic Chemistry, 17, 1066 (1952)) indicate for this compound a M. P. of 177–179° C. A sample was acetylated with acetic anhydride and pyridine. By crystallization from ether, the di-acetate, M. P. 165–168° C., was obtained (C. Djerassi and co-workers, J. Am. Chem. Soc., 74, 3634 (1952)).

EXAMPLE 3

*Allopregnan-3-α-ol-11,20-dione (VI) from allopregnan-3,11,20-trione (V)*

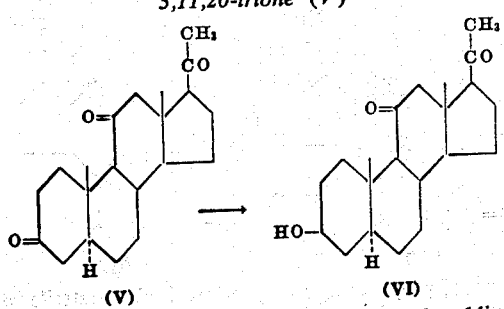

(V)　　　　　(VI)

The procedure of Example 1 is followed, adding to the yeast 0.5 g. of allopregnan-3,11,20-trione, M. P. 208–213° C., dissolved in 30 cc. of ethanol. After extraction of the filtrate in the usual manner, 200 mg. of a substance, M. P. 160–165° C. $(\alpha)_D^{27} = +93° \pm 4°$ (in $CHCl_3$), are obtained. By re-crystallization the M. P. does not vary. When mixed with a sample of allopregnan-3β-ol-11,20-dione, M. P. 183–185° C., the melting point is lowered. By acetylation in the usual manner, a mono-acetate M. P. 140–145° C., is obtained. By extraction of the yeast with acetone, 100 mg. of the starting compound (allopregnan-3,11,20-trione), M. P. 200–210° C., are recovered.

As it is known, the fermentative reduction method is much easier and gives higher yields and purer products in comparison with the chemical reduction methods (with hydrogen and nickel or platinum catalysts, or with boron-sodium hydride or lithium-aluminium hydride, which latter give further in many cases a steric direction to the reduction, different from that of the biochemical method). This fact brings to evidence the advantages and the importance of the present invention, that is, to have found the biochemical reducibility conditions for the class of compounds in question. In fact, in the compounds in question the oxygenated function in position 11 can be introduced both with known chemical and fermentative methods.

We claim:

The method of preparing a 3-hydroxy steroid of the class consisting of pregnan-3α-ol-11,20-dion, allopregnan-3α-ol-11,20-dion and allopregnan-3β,11α-diol-20-one which comprises subjecting the corresponding 3,20-dione having a member of the group consisting of free hydroxyl and keto radicals in the 11-position to the biochemical reduction action of fermenting yeast.

References Cited in the file of this patent

UNITED STATES PATENTS

| Number | Name | Date |
| --- | --- | --- |
| 2,184,167 | Schoeller | Dec. 19, 1939 |
| 2,264,861 | Schoeller | Dec. 2, 1941 |
| 2,602,769 | Murray et al. | July 8, 1952 |
| 2,658,023 | Shull et al. | Nov. 3, 1953 |
| 2,686,793 | Magerlein | Aug. 17, 1954 |
| 2,702,291 | Sondheimer | Feb. 15, 1955 |

OTHER REFERENCES

Butenandt et al.: Berichte 73 (1940), pages 818 to 820.
J. A. C. S. (I), 70, 1948, page 2028.
J. A. C. S. (II), 73, 1951, pages 4765–6.
J. A. C. S. (III), 74, 1952, page 3634.

UNITED STATES PATENT OFFICE

CERTIFICATE OF CORRECTION

Patent No. 2,866,736 December 30, 1958

Bruno Camerino et al.

It is hereby certified that error appears in the above numbered patent requiring correction and that the said Letters Patent should read as corrected below.

In the heading to the printed specification, between lines 8 and 9, insert -- Claims priority, application Italy September 4, 1953 --.

Signed and sealed this 21st day of April 1959.

(SEAL)
Attest:

KARL H. AXLINE
Attesting Officer

ROBERT C. WATSON
Commissioner of Patents